Dec. 19, 1950　　　T. P. PETERSON　　　2,534,475
HOG WATERING DEVICE
Filed Oct. 9, 1947　　　　　2 Sheets-Sheet 1
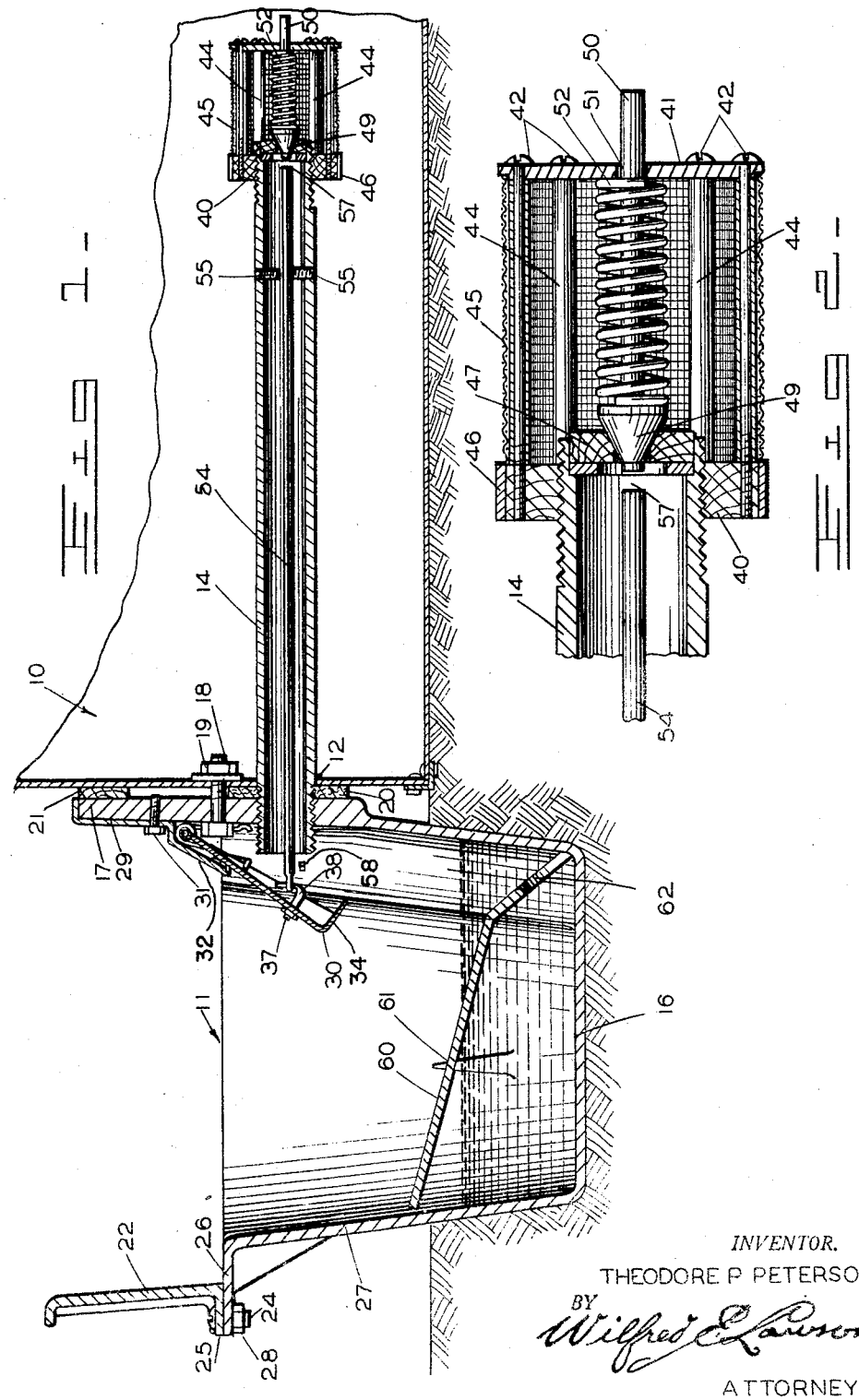
INVENTOR.
THEODORE P. PETERSON
BY
Wilfred E. Lawson
ATTORNEY Dec. 19, 1950 T. P. PETERSON 2,534,475
HOG WATERING DEVICE
Filed Oct. 9, 1947 2 Sheets-Sheet 2
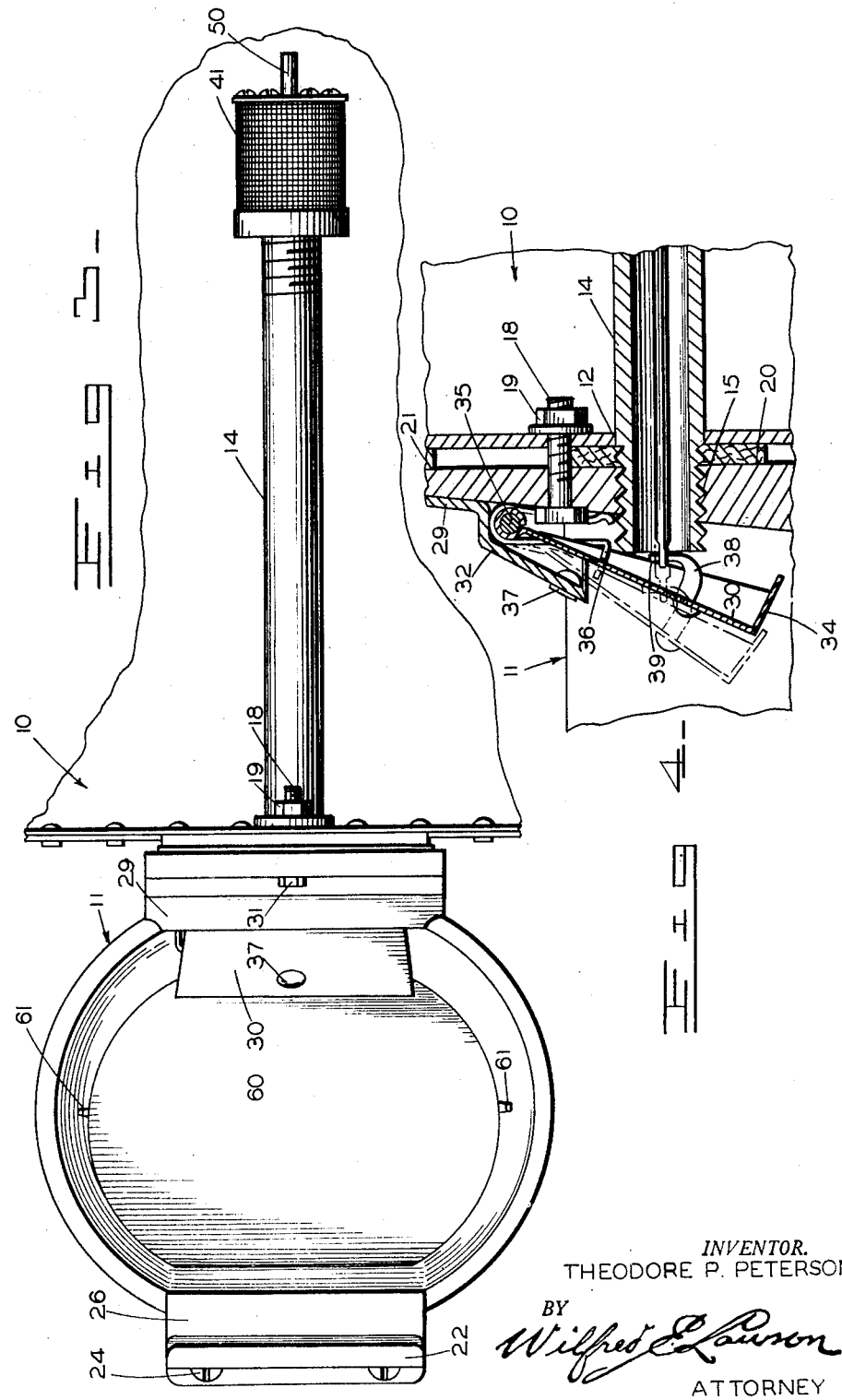
INVENTOR.
THEODORE P. PETERSON
BY
Wilfred E. Lawson
ATTORNEY Patented Dec. 19, 1950

2,534,475

UNITED STATES PATENT OFFICE 2,534,475

HOG WATERING DEVICE

Theodore P. Peterson, Mitchell, S. Dak., assignor to Hegvold Woodcraft Co. Inc., Mitchell, S. Dak., a corporation Application October 9, 1947, Serial No. 778,821

4 Claims. (Cl. 119—75)

This invention relates to a hog watering device and more particularly to a hog watering device for attachment to a tank or barrel so constructed and arranged that the fluid and operating valve of the device will not freeze up in cold weather.

It is an object of this invention to provide a hog watering device of the kind to be more particularly described hereinafter having a drinking bowl for attachment to the lower end of a tank or barrel with a tube or pipe carried by the bowl having a valve for disposition within the tank, the valve being so constructed and arranged that it will be free to operate in freezing weather and the bowl is so located below the surface of the earth that the water contained therein may be disposed below the freezing level in normal freezing weather.

Another object of this invention is to provide a hog watering device of this kind having a valve which is normally closed and is actuated to the open position by the engagement of a trigger with the side of a hog's face as the hog reaches within the bowl to obtain the water.

Still another object of this invention is to provide a hog watering device having a guard on one side of the drinking bowl to force the animal to drink from the ends of the bowl so that in reaching for the water when the water is at a low level the side of the animal's face will engage the trigger rockably carried by the bowl for pressing the valve open to admit more water to the bowl.

Still another object of this invention is to provide a hog waterer of this kind having a plate or false bottom therein inclined from the outer to the inner sides thereof, having the lower end disposed below the water inlet to the bowl so that as the water level falls in the bowl the water may be reached by an animal only by reaching to the lower end of the inclined plate which is also disposed below the valve actuating trigger, so that the hog's head will come into engagement with the trigger for admitting water when the water level in the bowl has reached such a low level.

With the above and other objects in view, my invention consists in the arrangement, combination and details of construction disclosed in the drawings and specification, and then more particularly pointed out in the appended claims.

In the drawings,

Figure 1 is a vertical longitudinal section through a hog watering structure constructed in accordance with the present invention.

Figure 2 is a longitudinal section on an enlarged scale of the control valve.

Figure 3 is a view in the top plan of the invention.

Figure 4 is a detailed sectional view of the trigger plate and associated parts drawn to an enlarged scale.

Referring to the drawings, the numeral 10 designates generally a tank or barrel for containing water from which the hogs or other stock animals may drink, and a drinking bowl 11 is detachably secured to the lower end of the barrel 10 from which the animals may drink directly.

An opening 12 is formed in one side wall of the tank 10 near the lower end thereof and a pipe or tube 14 engages through the opening 12 and into a threaded opening 15 on one side wall of the bowl 11 adjacent the upper edge thereof.

The water is adapted to flow through the end of the tube 14 in the tank into the bowl 11. The lower end of the bowl 11 is disposed in a hole in the ground for locating the bottom 16 of the drinking bowl substantially below the upper level of the ground whereby the water disposed in the bottom of the drinking bowl will be below the freezing level in normal freezing weather.

The drinking bowl 11 is provided with one side 17 which extends substantially above the upper edge of the other sides of the drinking bowl for attachment to the tank 10. A bolt 18 engages through the upwardly extending wall 17 and through a wall of the tank 10. A nut 19 engaging the bolt 18 within the tank secures the drinking bowl 11 thereto.

A rubber or other resilient washer 20 is disposed about the pipe 14 between the wall 17 and the tank 10 for sealing the opening 12 through the tank. A wooden spacing member 21 is carried between the upper end of the wall 17 and the tank 10 for spacing the upper end of the bowl 11 the same distance as the compressed width or thickness of the washer 20 for securely attaching the drinking bowl 11 to the tank 10.

An elevated flat guard 22 is secured on the outer edge of the drinking bowl 11 to provide an upper extension on the outer wall of the bowl over which the animals may not reach the water so that the hogs will be forced to drink from the bowl 11 at the opposite ends thereof.

A bolt 24 engages through a flange 25 on the lower end of the guard plate 22 and through a flange 26 formed on the upper edge of the outer wall 27 of the bowl 11.

A nut 28 engages the bolt 24 below the flange 26 for securing the guard on the bowl. A shield plate 29 is fixed on the inner surface of the inner wall 17 for covering the upper end of a trigger plate 30 pivotally secured thereto. The upper end of the shield plate 29 is adapted to abuttingly engage the upper end of the wall 17 and is secured thereto by a bolt 31 engaging therethrough.

The lower end of the shield plate 29 is inclined downwardly and forwardly as indicated by the numeral 32 for providing a space between the plate 29 and the wall 17 immediately above the vertical edges of the plate 11.

The trigger plate 30 is formed of an elongated sheet of metal or other suitable material having a downwardly or inwardly inclined flange 34 at the lower end thereof. A hinge pin or pintle 35 is fixed to or carried by the longitudinal upper edge of the trigger plate 30 and is rockably engaged within the end walls of the shield plate 29. A spring 36 is engaged about the pintle 35 at the ends thereof and engages the lower side of the the trigger plate 30 at one and the inner surface of the wall 17 at the other end for biasing the trigger plate 30 outwardly for purposes to be described hereinafter.

A stop lug 37 is fixed to or formed on the inner surface of the shield plate 29 near the lower end thereof with which the trigger plate 30 is adapted to engage for limiting the outward spring-pressed movement thereof.

The trigger plate 30 extends substantially along the inner side edge of the bowl 11 and is adapted to be engaged by the side of a hog's face or head as he reaches for water in the lower end of the bowl 11.

A hook 38 is fixed to or formed on the inner surface of the trigger plate 30 and is provided with an upwardly extending bill 39 thereon. The end of the pipe 14 within the tank 10 is threaded and provided with a wooden washer 40 engaged thereon. An outer plate 41 is secured on the washer 40 by bolts 42 which engage through the plates 41 and 40 and a tube or spacer 44 is disposed about the bolts 42 along the length thereof for spacing the plate 41 outwardly relative to the wooden washer 40.

A screen 45 is carried by the plates 40 and 41 about the bolts 42 and spacers 44. A metal sleeve 46 engages about the screen 45 and the wooden washer 40 for securing the screen 45 thereto.

A valve seat 47 is fixed in the end of the pipe 14 within the tank 10 and is held from sliding movement in the pipe by a split ring 48 secured thereto. The valve 49 is provided for engagement with the valve seat 47 and is formed with a valve stem 50 which extends through the valve 49 inwardly through an opening 51 in the plate 41. A spring 52 about the valve stem 50 constantly urges the valve 49 to the closed position in engagement with the valve seat 47.

The valve 49 may be made of metal and as the valve seat 47 is made of an insulating material, the valve 49 will not become frozen to the valve seat in freezing weather.

The wooden ring 40 prevents the cold from being transmitted through the pipe and screen to the valve stem 50 for substantially insulating the valve from the temperature of the pipe 14. The valve stem 50 engages through the valve 49 and slightly into the pipe 14.

A valve operating rod 54 is slidably disposed within the pipe 14 along the length thereof. Circumferentially spaced apart radial lugs 55 are carried by the pipe 14 adjacent the end thereof within the tank.

The rod 54 is loosely engaged between the inner ends of the lugs or studs 55 whereby the studs 55 which may be set screws engage through the walls of the tube providing a loose bearing for the rod or shaft 54. The outer end of the rod 54 is formed with a loop 56 for engagement about the bill 39 of the trigger 30.

The end of the rod 54 within the tank is spaced from the valve stem 50 as indicated by the numeral 57 so that the temperature of the water, the trigger plate, and the rod 54 will not be communicated to the valve stem 50 in the normal open position of the trigger and closed position of the valve 49.

Upon rocking of the trigger plate 30 the gap 57 is closed so that the rod 54 engages the stem 50 for opening the valve 49 thereby permitting the water within the tank 10 to flow through the pipe 14 into the bowl 11, the water striking the inner surface of the trigger plate 30 and flange 34 for deflecting the water downwardly away from the head of the animal drinking from the bowl.

A plug 58 seals a drain opening at the bowl 11 for holding the level of the water in the bowl below the level of the pipe 14. With the plug removed the water in the bowl may never flow over the upper edges thereof under any condition.

A downwardly and inwardly inclined plate 60 is carried by the bowl 11 for forcing the animal to drink from the inner side of the bowl 11 below the trigger plate 30 when the water level falls to a predetermined low level. Lugs or supporting members 61 are fixed to or formed on the inner surfaces of the side or end walls of the tank 11 for supporting the plate 60 at the side edges thereof.

The lower inclined edge of the plate 60 is formed with a U-shaped opening 62 disposed immediately below the water inlet pipe 14. When the water within the tank falls below the level of the upper edge of the plate 60 the animal must reach toward the lower inclined end of the plate 60 thus pressing his head or face against the trigger plate 30 for admitting more water into the bowl.

Any dirt or sediment in the bowl or dirt washed from the face of the hog will be forced downwardly through the opening 62 for disposition below the plate 60 where it may not be agitated by the drinking animals.

I do not mean to confine myself to the exact details on construction herein disclosed but claim all variations falling within the purview of the appended claims.

Having thus described my invention, what I claim is:

1. A watering attachment for a water supply tank having a wall opening, comprising a drinking bowl having a portion of its wall of thickened construction and projecting a substantial distance above the top of the bowl, said portion having a threaded opening below the level of the top of the bowl, means for securing said portion of the bowl to the wall of the tank with said openings aligned, a pipe secured in the threaded opening and extending through the tank wall opening into the tank, a valve closing the end of the pipe in the tank, a shield plate secured to said thickened portion above the threaded opening and directed downwardly and forwardly into the bowl, a trigger plate having an upper edge portion disposed between said shield plate and the thickened portion of the bowl and extending downwardly across the adjacent end of the pipe, pivot means connecting the said upper edge portion of the trigger plate with the shield plate, and a valve operating rod extending through said pipe and connected at its outer end with the trigger plate, the inner end of the rod being adapted to open the valve upon downward swinging movement of the trigger plate.

2. A watering attachment to a water supply tank having a wall opening, comprising a drinking bowl adapted to be secured at one side against a wall of the tank and having an opening aligned with the tank wall opening, a pipe leading through said openings into the tank, valve means upon the inner end of the pipe, a valve actuator pivotally supported upon the bowl and disposed across the outer end of the pipe, means connecting the actuator with the valve for effecting the opening of the latter upon the swinging of the actuator in one direction, said bowl having an outwardly extending integral flange at its top edge upon the side thereof opposite from the valve actuator, and an upstanding guard wall mounted upon said flange for compelling an animal to drink from the bowl at one end whereby to engage its head against the valve actuator.

3. A watering attachment to a water supply tank having a wall opening, comprising a drinking bowl adapted to be secured at one side against the tank wall and having an opening coinciding with the tank wall opening, a pipe mounted in and extending through said openings and having its other end extending into the tank, a valve operating trigger plate pivotally mounted upon the bowl wall above said one end of the pipe to extend downwardly across the adjacent end of the pipe, spring means normally urging outward swinging movement of the trigger plate away from the adjacent end of the pipe, a valve unit supported upon the said inner end of the pipe and comprising a cage having a collar threaded upon the inner end of the pipe and a plate in spaced relation with the collar, a valve seat unit of insulation material mounted upon the said inner end of the pipe within said cage, a valve element including a stem extending axially through the cage and passing through said plate, a spring member between the valve element and the plate and normally urging the element to position on the insulation material seat, and an actuating rod connected at one end with said trigger plate to be moved outwardly therewith away from the valve element, the other end of the rod being positioned in spaced relation with the valve element when the valve is closed whereby to prevent the transmission of cold through the rod to the valve element.

4. A watering attachment for a water supply tank having a wall opening, comprising a drinking bowl having a portion of its wall of thickened construction and projecting a substantial distance above the top of the bowl, said portion having a threaded opening below the level of the top of the bowl, means for securing said portion of the bowl to the wall of the tank with said openings aligned, a pipe secured in the threaded opening and extending through the tank wall opening into the tank, a valve closing the end of the pipe in the tank, a shield secured to said thickened portion above the threaded opening and directed downwardly and forwardly into the bowl, a trigger plate having an upper edge portion disposed between said shield plate and the thickened portion of the bowl and extending downwardly across the adjacent end of the pipe, pivot means connecting the said upper edge portion of the trigger plate with the shield plate, a valve operating rod extending through said pipe and connected at its outer end with the trigger plate, the inner end of the rod being adapted to open the valve upon downward swinging movement of the trigger plate, spring means housed beneath the shield plate and engaging the trigger plate and normally urging outward swinging movement of the trigger plate, spring means normally urging the valve to closed position, and said rod having its inner end in spaced relation with the valve when the valve is in closed position whereby to prevent the transmission of cold to the valve elements when the valve is in closed position.

THEODORE P. PETERSON.

REFERENCES CITED

The following references are of record in the file of this patent:

UNITED STATES PATENTS

| Number | Name | Date |
| --- | --- | --- |
| 444,324 | Allis | Jan. 6, 1891 |
| 474,986 | Burt | May 17, 1892 |
| 561,453 | Thayer | June 2, 1896 |
| 1,674,811 | Turner | June 26, 1928 |
| 2,338,072 | Quinn | Dec. 28, 1943 |

FOREIGN PATENTS

| Number | Country | Date |
| --- | --- | --- |
| 440,325 | Great Britain | Dec. 27, 1935 |